(12) United States Patent
Zou et al.

(10) Patent No.: US 11,335,092 B2
(45) Date of Patent: May 17, 2022

(54) ITEM IDENTIFICATION METHOD, SYSTEM AND ELECTRONIC DEVICE

(71) Applicant: ArcSoft Corporation Limited, Zhejiang (CN)

(72) Inventors: Wencai Zou, Zhejiang (CN); Gao Ouyang, Zhejiang (CN); Boxuan Yue, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 0 days.

(21) Appl. No.: 16/479,222

(22) PCT Filed: Jun. 21, 2019

(86) PCT No.: PCT/CN2019/092405
§ 371 (c)(1),
(2) Date: Jul. 19, 2019

(87) PCT Pub. No.: WO2020/143179
PCT Pub. Date: Jul. 16, 2020

(65) Prior Publication Data
US 2021/0397844 A1    Dec. 23, 2021

(30) Foreign Application Priority Data
Jan. 8, 2019   (CN) .......................... 201910016934.7

(51) Int. Cl.
*G06K 9/00* (2022.01)
*G06V 20/40* (2022.01)
(Continued)

(52) U.S. Cl.
CPC .............. *G06V 20/41* (2022.01); *G01B 11/22* (2013.01); *G01S 17/894* (2020.01);
(Continued)

(58) Field of Classification Search
CPC . G06T 2207/20081; G06T 2207/10024; G06T 2207/20084; G06T 2207/10021;
(Continued)

(56) References Cited

U.S. PATENT DOCUMENTS

2006/0177099 A1* 8/2006 Zhu ..................... G06K 9/00664
382/104
2008/0249870 A1* 10/2008 Angell ............... G06Q 30/0269
705/14.53
(Continued)

FOREIGN PATENT DOCUMENTS

| CN | 105205454 A | 12/2015 |
| CN | 106781121 A | 5/2017 |

(Continued)

OTHER PUBLICATIONS

CN search report dated Mar. 22, 2021 re: Application No. 201910016934.7.
(Continued)

Primary Examiner — Alex Kok S Liew
(74) Attorney, Agent, or Firm — Gang Yu

(57) ABSTRACT

An item identification method, system and electronic device are provided. The method includes: acquiring multi-frame images of the item by an image capturing device; processing the multi-frame images of the item to obtain position information and category information of the item in each frame image; acquiring auxiliary information of the item by an information capturing device; performing multi-modality fusion on the position information and the auxiliary information to obtain a fusion result; and determining an identification result of the item according to the category information and the fusion result. Through at least some
(Continued)

embodiments of the present disclosure, a problem of low identification accuracy when identifying an item in the related art is partially solved.

19 Claims, 4 Drawing Sheets

(51) Int. Cl.
| | |
|---|---|
| *G06T 7/80* | (2017.01) |
| *G06T 7/73* | (2017.01) |
| *G06T 7/50* | (2017.01) |
| *G06T 7/246* | (2017.01) |
| *G06F 16/23* | (2019.01) |
| *G01S 17/894* | (2020.01) |
| *G06V 10/25* | (2022.01) |
| *G06V 10/40* | (2022.01) |
| *G06V 10/75* | (2022.01) |
| *G06V 10/22* | (2022.01) |
| *G01B 11/22* | (2006.01) |
| *G06K 9/62* | (2022.01) |
| *G06T 5/50* | (2006.01) |
| *H04N 5/232* | (2006.01) |
| *G06Q 20/20* | (2012.01) |

(52) U.S. Cl.
CPC ....... *G06F 16/2379* (2019.01); *G06K 9/6215* (2013.01); *G06K 9/6267* (2013.01); *G06K 9/6289* (2013.01); *G06T 5/50* (2013.01); *G06T 7/248* (2017.01); *G06T 7/50* (2017.01); *G06T 7/74* (2017.01); *G06T 7/80* (2017.01); *G06V 10/22* (2022.01); *G06V 10/25* (2022.01); *G06V 10/40* (2022.01); *G06V 10/751* (2022.01); *H04N 5/232* (2013.01); *G06Q 20/201* (2013.01); *G06Q 20/208* (2013.01); *G06T 2207/10016* (2013.01); *G06T 2207/30241* (2013.01)

(58) Field of Classification Search
CPC . G06T 2207/10016; G06T 7/593; G06T 7/90; G06T 2207/10012; G06T 2207/10152; G06T 2207/30196; G06T 7/285; G06T 7/62; G06T 1/0007; G06T 1/20; G06T 2207/10048; G06T 2207/10068; G06T 2207/30201; G06T 2215/12; G06T 5/007; G06T 7/251; G06T 7/73; G06T 9/00; G06T 9/002; G06T 11/60; G06T 2207/10028; G06T 2207/10032; G06T 2207/20021; G06T 2207/20064; G06T 2207/20072; G06T 2207/20112; G06T 2207/30032; G06T 2207/30132; G06T 2207/30168; G06T 2207/30232; G06T 2207/30241; G06T 2207/30242; G06T 2207/30248; G06T 2210/12; G06T 5/006; G06T 7/0004; G06K 9/00288; G06K 9/00208; G06K 9/00718; G06K 9/00744; G06K 9/00248

See application file for complete search history.

(56) References Cited

U.S. PATENT DOCUMENTS

| | | | |
|---|---|---|---|
| 2010/0208987 A1* | 8/2010 | Chang | G06K 9/6224 382/165 |
| 2013/0156264 A1 | 6/2013 | Linus | |
| 2015/0379366 A1 | 12/2015 | Nomura et al. | |
| 2016/0364912 A1 | 12/2016 | Cho et al. | |
| 2017/0140578 A1* | 5/2017 | Xiao | G06T 3/4038 |

FOREIGN PATENT DOCUMENTS

| | | |
|---|---|---|
| CN | 108389316 A | 8/2018 |
| CN | 108470332 A | 8/2018 |
| CN | 108470339 A | 8/2018 |
| CN | 108921048 A | 11/2018 |
| CN | 108921645 A | 11/2018 |
| CN | 108961547 A | 12/2018 |
| CN | 108985359 A | 12/2018 |
| CN | 109003390 A | 12/2018 |
| CN | 109035579 A | 12/2018 |
| CN | 109117746 A | 1/2019 |
| JP | 2017058780 A | 3/2017 |
| WO | 2014136559 A1 | 9/2014 |
| WO | 2018197019 A1 | 11/2018 |

OTHER PUBLICATIONS

JP first examination report dated May 11, 2021 re: Application No. 2019-566841, pp. 1-5.
Corresponding EP search report dated Jan. 14, 2022 re: Application No. 19908887.3.

* cited by examiner

ITEM IDENTIFICATION METHOD, SYSTEM AND ELECTRONIC DEVICE

CROSS-REFERENCE TO RELATED APPLICATIONS

The present disclosure claims priority of Chinese Patent Application No. 201910016934.7, filed to China Patent Office on Jan. 8, 2019, named "Item Identification Method, System and Electronic Device". Contents of the present disclosure are hereby incorporated by reference in entirety of the Chinese Patent Application.

TECHNICAL FIELD

The embodiments of the present disclosure relate to image processing fields, and in particular to an item identification method, system and electronic device.

BACKGROUND

In the related art, smart containers are an important development direction for a new retail industry. Currently, there are two main solutions for identifying items, one is the traditional Radio Frequency Identification (RFID) technology, and the other is a static identification technology based on visual recognition.

For the first type of solution based on RFID electronic tags, it is necessary to develop different RFID electronic tags for different categories of items, and to achieve purposes of item identification and data statistics by identify data in the electronic tags through radio signals. However, on the one hand, the cost of electronic tags is high; on the other hand, the labor cost of labeling tags to thousands of items after entering the market is too high; moreover the accuracy for identify metal and liquid items is insufficient; and tags are easily torn off by humans, resulting in relative high loss rate.

For the second type of the static identification technology based on visual recognition, cameras are installed on the top of each layer of the container, and one image is captured before the door is opened and another image is captured after the door is closed, and then the categories and number of the items are automatically identified by visual recognition technology. Finally, the final result is obtained by comparison. However, the space utilization rate of this technology is low, because the camera should have a relative large distance from the lower layer, otherwise it will be difficult to capture the whole picture, and thus the identification accuracy is easily affected as being sheltered by items, and the items cannot be stacked.

As to the above problems, no effective solution has been proposed yet.

SUMMARY

At least some embodiments of the present disclosure provide an item identification method, system and electronic device, so as at least to partially solve a problem of low identification accuracy when identifying items in the related art.

In an embodiment of the present disclosure, an item identification method is provided, which includes: acquiring multi-frame images of the item by an image capturing device; processing the multi-frame images of the item to obtain position information and category information of the item in each frame image; acquiring auxiliary information of the item by an information capturing device; performing multi-modality fusion on the position information and the auxiliary information to obtain a fusion result; and determining an identification result of the item according to the category information and the fusion result.

In an optional embodiment, processing the multi-frame images of the item to obtain the position information and the category information of the item in each frame image including: performing image pre-processing on each frame image of the item; determining an item detection box and the category information in the each frame image after the image pre-processing, and the item detection box includes at least one item; and determining the position information of the item according to the item detection box.

In an optional embodiment, the method further includes: performing non-maximum suppression on the item detection box.

In an optional embodiment, the method further includes: acquiring multi-frame images of a target part by the image capturing device; and processing the multi-frame images of the target part to obtain position information and a determination result of the target part in the each frame image.

In an optional embodiment, the method further includes: determining the identification result of the item according to the position information and the determination result of the target part in the each frame image, and the category information and the fusion result of the item in the each frame image.

In an optional embodiment, processing the multi-frame images of the target part to obtain the position information and the category information of the target part in the each frame image including: performing image pre-processing on the target part in the each frame image to enhance an image contour of a target part of an user; selecting a region of interest of a part where the target part of the user appears in the each frame image after the image pre-processing; extracting feature information in the region of interest of the part to obtain a plurality of part features; and identifying the plurality of part features by a pre-trained classifier to obtain the position information and the determination result of the target part in the each frame image.

In an optional embodiment, selecting the region of interest of the part where the target part of the user appears in the each frame image after the image pre-processing including: scanning the each frame image through at least one sub-window to determine the region of interest of the part where the target part of the user appears in the each frame image.

In an optional embodiment, the method further includes: performing fine-grained classification on the item.

In an optional embodiment, the information capturing device includes at least one of the following: a depth camera, a card reader, a gravity device and an odor sensor.

In an optional embodiment, the method further includes: acquiring, when the information capturing device is the depth camera, a depth image of the item by the depth camera, the auxiliary information of the item comprising depth information.

In an optional embodiment, performing multi-modality fusion on the position information and the auxiliary information to obtain the fusion result including: acquiring lens parameters and position parameters of the image capturing device and the depth camera; obtaining a position of the item in a coordinate system of the depth camera according to the lens parameters of the depth camera, the depth information and the position of the item in the depth image; calibrating, according to the position parameters of the image capturing device and the depth camera, a relative position relationship of the image capturing device relative to the depth camera based on the coordinate system of the depth camera; determining mapping position information of the item in the image captured by the image capturing device corresponding to the position of the item in the depth image according to the lens parameters, the position of the item in the depth image, the depth information and the relative position relationship; and comparing the position information with the mapping position information to obtain the fusion result.

In an optional embodiment, acquiring the multi-frame images of the item by the image capturing device including: turning on the image capturing device to obtain a video of the item; and intercepting the multi-frame images of the item from the video.

In an optional embodiment, the method further includes: determining a tracking trajectory of the item according to the fusion result; sorting the tracking trajectory to obtain a trajectory classification result, and the tracking trajectory result corresponds to a movement result of the item; determining a taking result and a returning result according to the trajectory classification result; and updating an item management list according to the taking result and the returning result.

In an optional embodiment, determining the tracking trajectory according to the fusion result including: acquiring the position information and a moving tendency of the item according to the fusion result; and determining a matching degree between a detection result of a current frame and a detection result of a previous frame according to a coincidence similarity and a feature similarity between a current detection box and a predicated prior box of the item to obtain the tracking trajectory of the item, and the predicated prior box is obtained according to the moving tendency of the item based on the position information of the item in the previous frame; and the tracking trajectory includes: a position, category and movement time stamp of the item at each time node.

In an optional embodiment, sorting the tracking trajectory to obtain the trajectory classification result including: extracting a movement length of the item from the tracking trajectory; and sorting the tracking trajectory according to a pre-trained classification decision tree model and the movement length of the item to obtain the trajectory classification result.

In an optional embodiment, determining the taking result and the returning result according to the trajectory classification result including: obtaining the trajectory classification result of the image capturing device, or the image capturing device combined with the information capturing device at the same time; establishing a classification determination scheme according to the trajectory classification result of the image capturing device, or the image capturing device combined with the information capturing device at the same time; and determining the taking result or the returning result of the item according to the classification determination scheme and the trajectory classification result.

In an optional embodiment, the method further includes: obtaining an item price list, and the item price list includes a price of each item; determining a categories and number of the items being taken according to a taking result and a returning result of the item; and determining a settlement price of the item according to the categories and number of the items being taken, and a price of the each item.

In an optional embodiment, the method is applied to a new retail scenario, and the new retail scenario including at least one of following: self-service stores and smart containers.

In another embodiment of the present disclosure, an item identification system is provide, which includes: an image capturing device, configured to acquire multi-frame images of the item; an information capturing device, configured to acquire auxiliary information of the item; and a server, configured to process the multi-frame images of the item to obtain position information and category information of the item in each frame image, perform multi-modality fusion on the position information and the auxiliary information to obtain a fusion result, and determine an identification result of the item according to the category information and the fusion result.

In an optional embodiment, the image capturing device is further configured to obtain multi-frame images of a target part.

In an optional embodiment, the server is further configured to process the multi-frame images of the target part to obtain position information and a determination result of the target part in the each frame image, and determine the identification result of the item according to the position information and the determination result of the target part, and the category information and the fusion result of the item in the each frame image.

In an optional embodiment, the system further includes: an item storage device, the image capturing device and the information capturing device are turned on when the item storage device is opened.

In another embodiment of the present disclosure, an electronic device is provided, which includes: a processor; and a memory for storing executable instructions of the processor; and the processor is configured to perform any item identification method as described above by executing the executable instructions.

In another embodiment of the present disclosure, a storage medium is provided, the storage medium includes a stored program, and a device in which the storage medium is stored is controlled to execute any item identification method as described above when the program is running.

Through at least some embodiments of the present disclosure, multi-frame images of the item is acquired by an image capturing device; the multi-frame images of the item is processed to obtain position information and category information of the item in each frame image; auxiliary information of the item is acquired by an information capturing device; a fusion result is obtained by performing multi-modality fusion on the position information and the auxiliary information; and an identification result of the item is determined according to the category information and the fusion result. In the at least some embodiments of the present disclosure, the multi-frame images can be acquired, the position information and category information of the item can be obtained, and the item can be identified in combination with the auxiliary information of the item, and the categories and number of the items can further be identified accurately, so as to solve the problem of low identification accuracy when identifying items in the related art.

BRIEF DESCRIPTION OF THE DRAWINGS

The accompanying drawings are used to provide further understanding of the present disclosure, and are part of the description. The exemplary embodiments and description are used to explain the present disclosure rather than limit the present disclosure. In the accompanying drawings.

DETAILED DESCRIPTION

Figure 1:
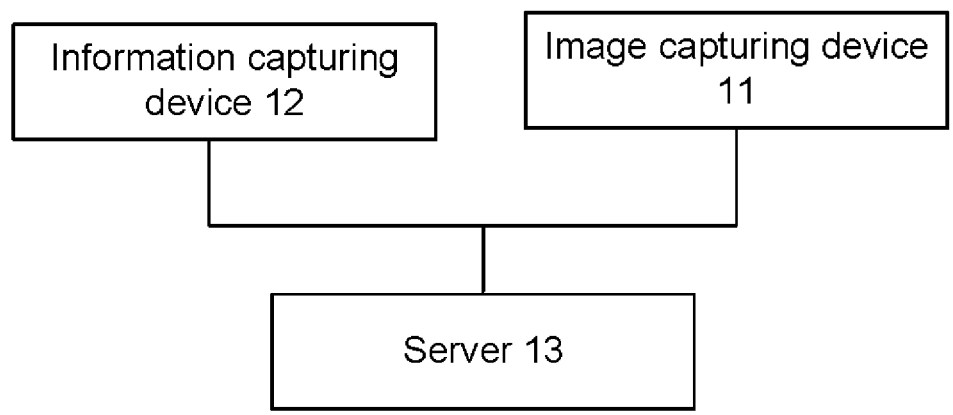
FIG. 1 is a structural block diagram of an item identification system according to an embodiment of the present disclosure.

In order to help those skilled in the art to better understand the solution of the present disclosure, the following will clearly and completely describe the technical solution in the embodiments of the present disclosure with reference to the accompanying drawings in the embodiments of the present disclosure. It is apparent that the described embodiments are merely a part of the embodiments of the present disclosure, and not all of the embodiments. Based on the embodiments of the present disclosure, all other embodiments can be obtained by those skilled in the art without creative efforts shall fall within the scope of the present disclosure.

It should be noted that the terms "first", "second" and the like in the specification and claims of the present disclosure are used to distinguish similar objects, and are not necessarily used to describe a particular sequence or order. It is to be understood that the data used in this manner may be interchanged as appropriate, so that the embodiments of the present disclosure described herein can be implemented in a sequence other than other those illustrated or described herein. In addition, the terms "comprise" and "include" and any variations thereof are intended to cover non-exclusive inclusion. For example, a process, method, system, product or device that includes a series of steps or elements is not necessarily limited to those steps or elements that are clearly listed, but may include other steps or elements that are not clearly listed or inherent to such process, method, product or device.

In order to better understanding the present disclosure, the following will explain some of the terms or nouns involved in the various embodiments of the present disclosure:

New retail refers to upgrade and transform production, distribution and sales of items by use of big data, artificial intelligence and other technical means to upgrade and transform the production, distribution and sales of goods relying on the internet, and perform deep integration of online services, offline experience and modern logistics.

RFID, also known as RFID tags, may be used for identifying specific targets, read and write data through radio electric signals, but without establish mechanical or optical contact between the identification system and the specific targets.

Smart container refers to a container equipped with visual recognition technology.

Loss rate refers to a ratio of the number of items lost during the operation of the container to the total number of items.

Time of Flight (TOF) depth camera, also known as 3D camera, is different from a traditional camera in that the TOF depth camera may simultaneously capture grayscale information of the scene and 3D information containing depth information.

NMS refers to Non Maximum Suppression.

Camera refers to a specifically designed camera.

Multi-frame images refer to each image containing at least one frame acquired via a video.

The embodiments of the present disclosure may be applied to various application scenarios of new retail, for example, for the use of a smart container in new retail. In the related art, during the item identification process, it is impossible to accurately identify the categories and number of the items taken by the user in the images captured by an image capturing device, for example, merely by obtaining an image before the door is opened and an image after the door is closed, identifying the categories and number of the items automatically by visual recognition technology, and obtaining a final result by comparison, it will appear that the taken item cannot be identified by only one image. However, in at least some embodiments of the present disclosure, by installing at least one camera in the smart container, a video may be obtained after the door is opened, multi-frame images in the video may be analyzed, and multi-modality fusion is performed on the images, and thereby accurately identifying the categories and number of the items, improving the intelligent degree of the item identification in the smart container, and reducing the loss rate.

The following will explain the present disclosure by detailed embodiments.

The embodiments of the present disclosure may be applied to fields of new retail, and the specific application area may be in a smart container, a smart cabinet, a shopping mall, a supermarket, etc., and the present disclosure is illustrated by taking the smart container as an example but is not limited thereto.

FIG. 1 is a structural block diagram of an item identification system according to an embodiment of the present disclosure. As shown in FIG. 1, the system may include: an image capturing device 11, an information capturing device 12 and a server 13.

The image capturing device 11 is configured to acquire multi-frame images of the item. Optionally, the image capturing device may be installed in an area where as a container or a shopping mall is located, and the number of the image capturing devices is at least one. Optionally, in the embodiment of the present disclosure, the image capturing device may be a general camera, for example, an Red Green Blue (RGB) camera, an infrared camera, or the like. Of course, those skilled in the art may adjust the type and number of image capturing devices according to practical requirements without being limited to the examples given herein, and when the number of image capturing devices is two or more, the image capturing devices may be the same type or a combination of different types.

The information capturing device 12 is configured to acquire auxiliary information of the item. The information capturing device 12 may be installed around the image capturing device, and may cooperate with the image capturing device, and the number of information capturing devices is at least one. Optionally, in the embodiment of the present disclosure, the information capturing device may include: a depth camera for acquiring depth information, a card reader for scanning the item identification code, a gravity device (such as a gravity plate) for acquiring gravity information, an odor sensor for acquiring odor information, and the like. Specifically, the depth camera includes a TOF depth camera, a binocular camera, a structured light camera, and the like. Of course, those skilled in the art can adjust the type and number of information capturing devices according to practical requirements without being limited to the examples given herein, and when the number of information capturing devices is two or more, the information capturing devices may be the same type or a combination of different types.

For example, when the information capturing device is a gravity device, it can determine whether the items are taken and which items are approximately taken by comparing gravity information acquired by the gravity device at different time points. The gravity device may be installed in the item storage device. The gravity information detected by the gravity device is combined with the item information analyzed by the image capturing device to determine an item identification result.

For example, when the information capturing device is an odor sensor, odor information of the item acquired by the odor sensor is combined with the item information analyzed by the image capturing device to determine the item identification result. The odor sensor may be installed in the item storage device.

The server 13 is configured to process the multi-frame images of the item to obtain position information and category information of the item in each frame image, perform multi-modality fusion on the position information and the auxiliary information to obtain a fusion result, and determine an identification result of the item according to the category information and the fusion result.

In the above mentioned item identification system, the image capturing device 11 is configured to acquire multi-frame images of the item, the information capturing device 12 is configured to acquire the auxiliary information of the item, and the server 13 is configured to process the multi-frame images of the item to obtain position information and category information of the item in each frame image, perform multi-modality fusion on the position information and the auxiliary information to obtain the fusion result, and determine the identification result of the item according to the category information and the fusion result. By identifying the position and category of the item in the image, and multi-modal fusing with the auxiliary information acquired by the information capturing device, the item identification result can be accurately obtained, and the categories and number of items taken by the user can also be accurately identified, so as to improve the item identification rate, reduce the loss rate, and solve the technical problem of low identification accuracy when identifying an item in the related art.

The number of the image capturing devices and the information capturing devices may be reasonably set according to each applied area and equipment. For example, for one smart container, two image capturing devices and one information capturing device may be installed.

Optionally, the information capturing device is a TOF depth camera, which is configured to acquire the depth image of the item, and the auxiliary information of the item includes depth information. That is, the depth image of the item may be collected by the depth camera to obtain the depth information of the item, so that the item being overlapped or covered can be effectively identified.

In an optional embodiment of the present disclosure, in the item identification system, the image capturing device is further configured to acquire multi-frame images of a target part. Optionally, the target part may be a hand, a machine hand, a prosthesis or other body parts, mechanical devices, etc., which may take the item. That is, in this embodiment at least one image may be detected when the user takes the item by hand, and a location of the target part may be analyzed by detecting the image of the target part of the user.

Optionally, the server is further configured to process the multi-frame images of the target part to obtain the position information and the determination result of the target part in each frame image, and determine the identification result according to the position information and the determination result of the target part, and the category information and the fusion result of the item in each frame image. That is, the position information and the determination result of the target part are combined with the category information and the fusion result of the item obtained by analyzing the image which is captured by the image capturing device and information capturing device to improve the identification accuracy of the item. The categories and number of the items taken by the user may also be obtained by the detection of the target part.

Optionally, the determination result indicates whether it is the target part or not.

Optionally, the detection of the target part may be the detection of a hand. The following optional embodiments of the present disclosure will be described by taking the user's hand as the target part of the user, and the position of the hand in each frame is detected.

In an optional embodiment of the present disclosure, the item identification system further includes: an item storage device, and the image capturing device and the information capturing device are turned on when the item storage device is opened.

Optionally, the item storage device refers to an apparatus or a device used for storing items. In this embodiment of the present disclosure, the item storage device may include but is not limited to the above mentioned smart container.

Through the item identification system in the above-mentioned embodiments of the present disclosure, open information of the item storage device is used as trigger information for turning on the image capturing device and the information capturing device simultaneously to respectively acquire the multi-frame images of the item and the auxiliary information of the item, so as to analyze the multi-frame information and the auxiliary information to obtain the information of the item, such as the position information and the category information, and then the multi-modality fusion is performed on the information of the item and the auxiliary information to obtain the identification result of the item. Further, by detecting the multi-frame images of the target part acquired by the image capturing device, the target part is detected, and the category information and determination result of the target part in each frame image are combined with the category information and fusion result of the item obtained by analyzing the image which is acquired by the image capturing device and information capturing device, to more accurately obtain the identification result of the item, and improve the identification accuracy of the item.

The following will explain an item identification method applied in such item identification system according to an embodiment of the present disclosure.

According to an embodiment of the present disclosure, an item identification method is provided. It should be noted that the steps illustrated in the flowchart of the accompanying drawings may be executed in a computer system such as a set of computer executable instructions, and although the logical order is shown in the flowchart, in some cases the steps shown or described may be performed in a different order than the ones described herein.

Figure 2:
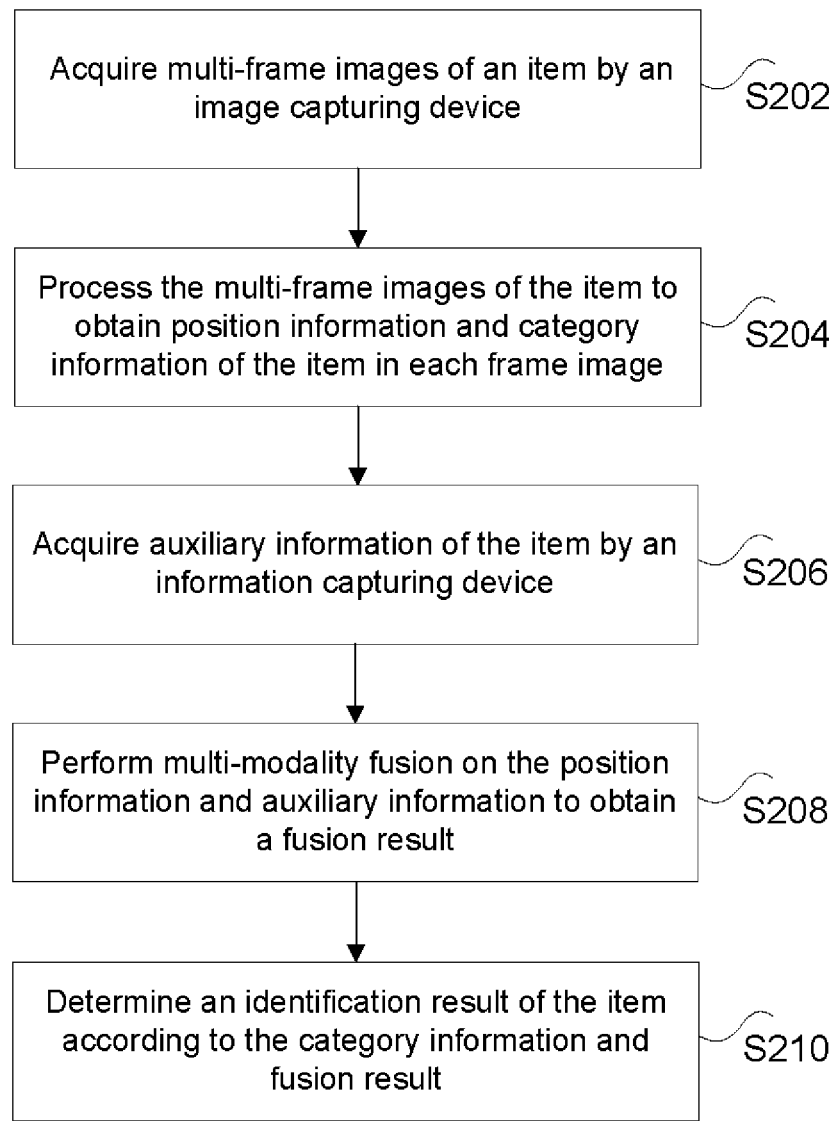
FIG. 2 is a flowchart of an item identification method according to an embodiment of the present disclosure.

FIG. 2 is a flowchart of an item identification method according to an embodiment of the present disclosure, as shown in FIG. 2, the method includes the following steps S202-S210.

At step S202, multi-frame images of an item are acquired by an image capturing device.

At step S204, the multi-frame images of the item is processed to obtain position information and category information of the item in each frame image.

At step S206, auxiliary information of the item is acquired by an information capturing device.

At step S208, multi-modality fusion is performed on the position information and auxiliary information to obtain a fusion result.

At step S210, an identification result of the item is determined according to the category information and fusion result.

Through the above described steps, the multi-frame images of the item is acquired by the image capturing device; the multi-frame images of the item is processed to obtain the position information and the category information of the item in each frame image; the auxiliary information of the item is acquired by the information capturing device; the multi-modality fusion is performed on the position information and auxiliary information to obtain the fusion result; and the identification result of the item is determined according to the category information and fusion result. In this embodiment, the multi-frame images may be acquired, the position information and category information of the item may be analyzed and combined with the auxiliary information of the item to accurately identify the item, and the categories and number of the items taken by the user can also be accurately identified, so as to solve the problem of low identification accuracy when identifying the item.

In the embodiment of the present disclosure, the item identification method may also be applied in new retail scenario, and the new retail scenario at least includes: selling goods by smart containers in self-service stores, and selling goods by smart containers in supermarket.

The following will describe the above steps in detail.

At step S202, the multi-frame images of the item are acquired by the image capturing device.

Optionally, in an embodiment of the present disclosure, the image capturing device may be a general camera, such as an RGB camera, an infrared camera, a camera, or the like. Of course, those skilled in the art may adjust the types and number of image capturing devices according to practical requirements without being limited to the examples given herein. The number of image capturing devices is at least one, and when the number of image capturing devices is two or more, the image capturing devices may be the same type or a combination of different types. Each image capturing device can capture at least two images. When identifying, it is necessary to synchronize the image capturing time points between the image capturing devices, that is, the images at the same time point are separately analyzed to identify the items from multiple angles.

Optionally, the number of the items is at least one, and the items may be placed in an item storage device, for example, the items are placed in a smart container. The item storage device may include but is not limited to the smart container.

Optionally, the image capturing device and the information capturing device are turned on when detecting the item storage device is opened.

In an optional embodiment, acquiring the multi-frame images by the image capturing device includes: turning on the image capturing device to obtain a video of the item; and intercepting the multi-frame images of the item from the video. That is, after the item storage device is opened, the video in the item storage device may be acquired by the image capturing device in real time, and after the item storage device is closed or the detection of the user's taking action is stopped, the multi-frame images is obtained from the video.

At step S204, the multi-frame images of the item is processed to obtain position information and category information of the item in each frame image.

In an embodiment of the present disclosure, the image is processed to focus on identifying the position and category of the item in the image, and the position information is analyzed to focus on analyzing a current position of the item in the image or a relationship between the current position of the item and a position of the item in a previous few frame images.

In an optional embodiment of the present disclosure, there are two cases when processing the image. The first case is to identify the position and category of the item in the image; and the second case is to identify the position of the target part in the image.

For the first case, the position and the category of the item in the image are identified.

Optionally, processing the multi-frame images of the item to obtain the position information and category information of the item in each frame image includes: performing image pre-processing on the each frame image of the item, where image pre-processing includes at least one of the following: image enhancement, image scaling, and image mean remove; determining the item detection box and category information in the each frame image after image pre-processing, where the item detection box includes at least one item; and determining the position information of the item according to the item detection box.

Optionally, before determining the item detection box in the each frame image after image pre-processing, multiple item prior boxes may be extracted first, and then the item prior boxes are subjected to deep learning and analysis to determine the item detection box and category information of the item.

When analyzing the item detection box, the item prior boxes and the position of the target part can be combined to accurately identify the item detection box.

Optionally, the item identification method further includes: performing NMS on the item detection box, to avoid false detection and improve the identification accuracy of the item.

That is, when identifying the item in the image, the image is preprocessed first, the preprocess operation includes image enhancement, image scale, image mean remove and the like; and then the item detection box is extracted and the NMS is performed on the item detection box, to avoid false detection and improve the identification accuracy of the item.

In another optional embodiment, the item identification method further includes: performing fine-grained classification on the item, to improve the identification accuracy of the item. That is, the item identification information may be obtained by performing fine-grained classification on the item. Optionally, minor difference between similar items may be analyzed by performing fine-grained classification on the items to improve the identification accuracy of the item. Optionally, the categories of the items according to an optional embodiment of the present disclosure may include but is not limited to: vegetables, fruits, snacks, fresh meat, seafood, etc.

Figure 3:
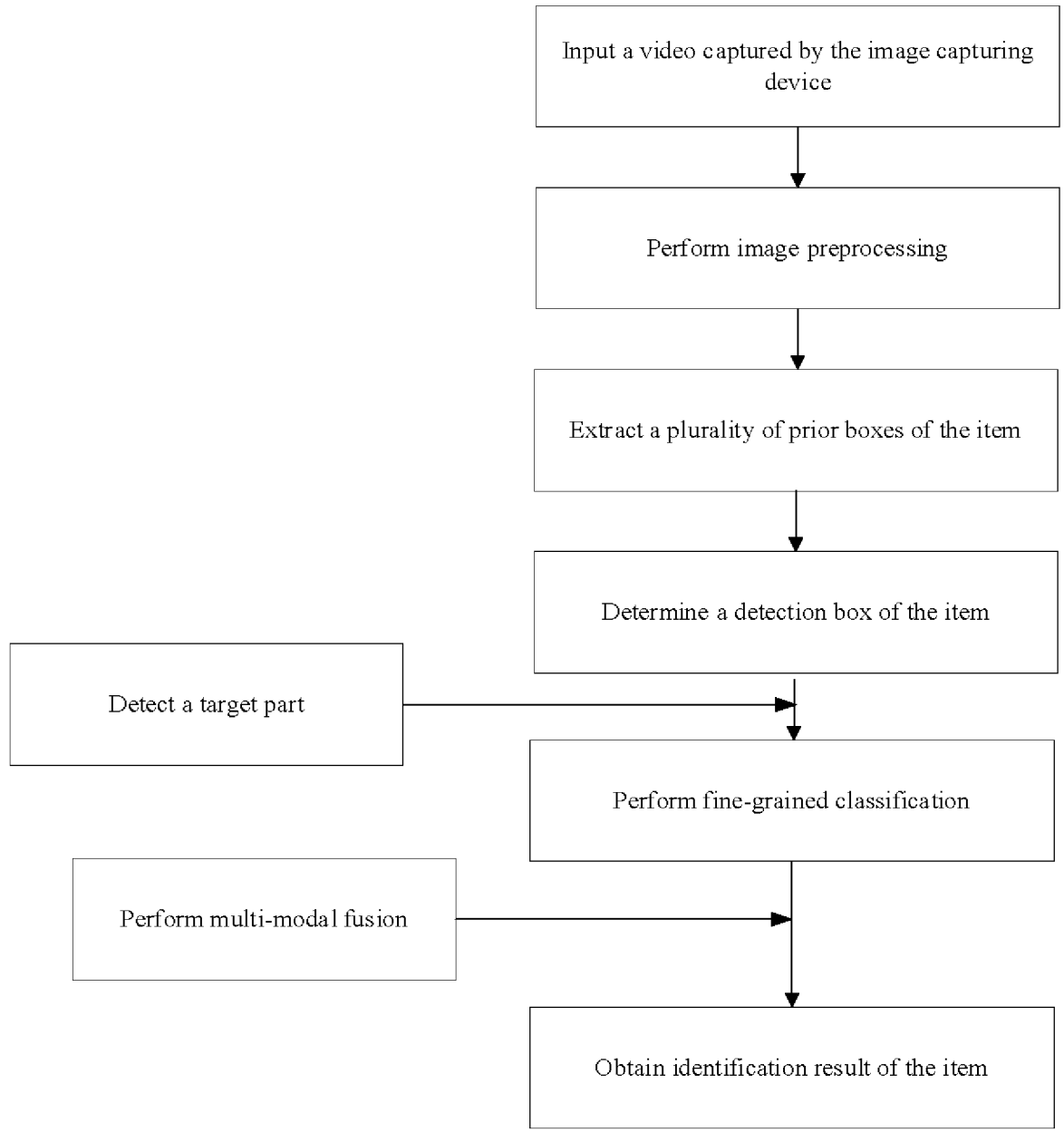
FIG. 3 is a flowchart of a method for realizing item identification according to an embodiment of the present disclosure.

FIG. 3 is a flowchart of a method for realizing item identification according to an embodiment of the present disclosure. As shown in FIG. 3, when performing item identification, a video captured by the image capturing device is input first, and after the video is edited, the image is preprocessed, the item prior boxes are extracted and further analyzed in combination with the detection of the target part to obtain the item detection box, and then non-maximum suppression is performed on the item detection box, and finally, the item identification result can be determined by using the fine-grained classification and multi-modal fusion.

For the second case, the position of the target part in the image is identified. In an embodiment of the present disclosure, a hand is taken as the target part for explanation.

In an optional embodiment of the present disclosure, the item identification method further includes: acquiring the multi-frame images of the target part by the image capturing device; processing the multi-frame images of the target part to obtain the position information and determination result of the target part in the each frame image.

In another optional embodiment of the present disclosure, processing the multi-frame images of the target part to obtain the position information and determination result of the target part in the each frame image includes: performing preprocess on the target part in the each frame image to enhance an image contour of a target part of a user. The image preprocess may include at least one of the following: image noise reduction, image enhancement, contrast enhancement, image smoothing, image sharpening, etc.; selecting a region of interest (ROI) of the part where the target part of the user appears in the each frame image after the image pre-processing; extracting feature information in the ROI of the part to obtain a plurality of part features; and identifying the plurality of part features by a pre-trained classifier to obtain the position information and the determination result of the target part in the each frame image.

The image pre-processing according to the embodiment of the present disclosure mainly performs image pre-processing on the each frame image of the target part, and enhances the hand part by image pre-processing (including image noise reduction, image enhancement, and the like). The target contour is enhanced by operations such as contrast enhancement, image smoothing, noise filtering, image sharpening, etc.

After the image pre-processing, multiple ROIs of the part may be determined. For example, multiple gesture ROIs are determined, and some possible gesture ROIs are selected from the global sensing region of a camera.

Optionally, selecting the ROI of the part where the target part of the user appears in the each frame image after the image pre-processing includes: scanning the each frame image through at least one sub-window to determine the ROI of the part where the target part of the user appears in the each frame image. That is, 1/n of an image height is selected as the minimum scale of the hand by applying at least one sub-window to scan the whole image, and the size of each sub-window is gradually increased by a certain multiple of the minimum scale.

The above each gesture ROI indicates a region where a gesture of a hand may be identified, and when determining these gesture ROIs, factors such as the position of an arm and the position of a container may be generally considered.

In an optional embodiment of the present disclosure, the feature information in the ROIs of the part is extracted and multiple part features are obtained. For example, a hand gesture that may take the item or a hand gesture that may return the item may be identified.

Optionally, the classifier may be a pre-trained part classification model. For example, the part classification model is determined as a gesture classification model. After the extracted hand features are input to the pre-trained classification model, the hand may be identified to determine the full size, position and contour of the hand. Of course, in an optional embodiment of the present disclosure, features of other parts such as head and shoulder may also be identified to more accurately analyze the relative position between the item and the item storage device, and the relative position between the item and the user.

Figure 4:
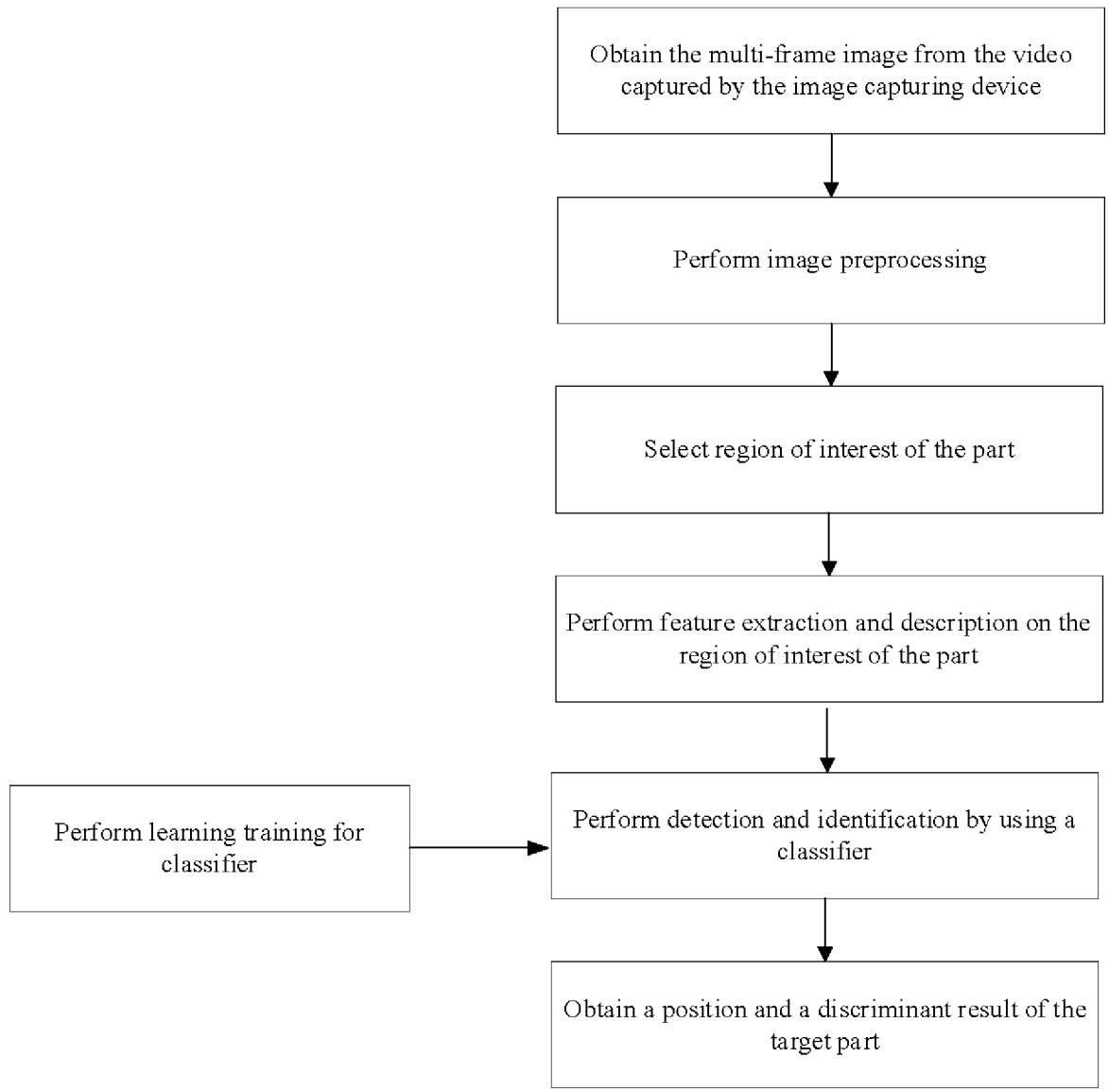
FIG. 4 is a flowchart of a method for identifying a target part in an image according to an embodiment of the present disclosure.

FIG. 4 is a flowchart of a method for identifying a target part in an image according to an embodiment of the present disclosure. As shown in FIG. 4, when performing the image identification, the video of the item may be acquired by the image capturing device, multi-frame images may be analyzed, the captured image may be preprocessed, multiple ROIs of the part may be extracted, feature extraction and description may be performed on the each ROI of the part, and at least one hand gesture is detected and identified by the classifier to output the identification result for making decision.

In the above embodiment, after the ROIs of the part are extracted, the target may be scaled to a uniform determination size, and various features may be calculated. A set of features is selected as the basis for the classification, and then the feature is input to the pre-trained classifier to identify the target ROI.

Optionally, the item identification result may be determined according to the position information and determination result of the target part in the each frame image, the category information and fusion result of the item obtained by analyzing the image which is acquired by the image capturing device and information capturing device.

At step S206, the auxiliary information of the item is acquired by the information capturing device.

Optionally, in an embodiment of the present disclosure, the information capturing device may include: a depth camera for acquiring depth information, a card reader for scanning the item identification code, a gravity device (such as a gravity plate) for acquiring gravity information, an odor sensor for acquiring odor information, and the like. Specifically, the depth camera includes a TOF depth camera, a binocular camera, a structured light camera, and the like. Of course, those skilled in the art may adjust the types and number of information capturing devices according to practical requirements without being limited to the examples given herein, and when the number of information capturing devices is two or more, the information capturing devices may be the same type or a combination of different types.

For example, when the information capturing device is a gravity device, it can determine whether the items are taken and which items are approximately taken by comparing the gravity information acquired by the gravity device at different times. The gravity device may be installed in the item storage device. The gravity information detected by the gravity device is combined with the item information analyzed by the image capturing device to determine the item identification result.

For example, when the information capturing device is an odor sensor, the odor information of the item acquired by the odor sensor is combined with the item information analyzed by the image capturing device to determine the item identification result. The odor sensor may be installed in the item storage device.

Optionally, the information capturing device is a depth camera, which is configured to acquire the depth image of the item, and the auxiliary information of the item includes depth information. That is, the depth image of the item may be acquired by the selected depth camera. For example, after the user takes multiple items, items may be overlapped or sheltered, it may be impossible to accurately analyze the sheltered item based on the image captured by the image capturing device, so the information capturing device may be used for acquiring the auxiliary information (such as the depth information) of the item, and the auxiliary information may be analyzed to obtain the analyze result of the item.

At step S208, the multi-modality fusion is performed on the position information and auxiliary information to obtain the fusion result.

In another optional embodiment of the present disclosure, performing the multi-modality fusion on the position information and auxiliary information to obtain the fusion result includes: acquiring lens parameters and position parameters of the image capturing device and the depth camera, the lens parameters at least include: a camera focal length and a camera center point; the position parameters are configured to indicate the position of the item in the depth image, and the position parameters at least include: installation coordinates of each image capturing device or depth camera; acquiring the position of the item in the coordinate system of the depth camera according to the lens parameter of the depth camera, the depth information and the position of the item in the depth image; calibrating, according to the position parameters of the image capturing device and the depth camera, a relative position relationship of the image capturing device relative to the depth camera based on the coordinate system of the depth camera; determining mapping position information of the item in the image captured by the image capturing device corresponding to the position of the item in the depth image according to the lens parameters, the position of the item in the depth image, the depth information and the relative position relationship; and comparing the position information with the mapping position information.

The following describes the multi-modality fusion. The multi-modality fusion is performed on the identification result according to the depth information. The multi-modality fusion in the embodiment of the present disclosure is applied to the images captured by a general camera and a depth camera.

Two image capturing devices (defined as general cameras, namely cameral and camera 3) and one depth camera (namely depth camera 2) are taken as examples for explanation. The lens parameters and position parameters of the three cameras are acquired before delivery, where, the lens parameters include a camera focal length, a camera center point, etc. The coordinate of the item in the depth camera 2 is acquired according to the lens parameter and the position parameter of the depth camera 2. The relative position relationship of the image capturing device relative to the depth camera 2 is calibrated based on the coordinate system of the depth camera 2. The mapping position information of the item in the image capturing device (namely the camera 1 and camera 2) corresponding to the position of the item in the depth image is determined according to the lens parameters, the position of the item in the depth image, the depth information and the relative position relationship. The position information is compared with the mapping position information to obtain the fusion result.

In the camera model, based on a principle of pinhole imaging, the position of the three-dimensional point in the image and the position of the three-dimensional point in the camera coordinate system satisfy the following relationship:

$$s \begin{bmatrix} u \\ v \\ 1 \end{bmatrix} = \begin{bmatrix} f_x & 0 & m_x \\ 0 & f_y & m_y \\ 0 & 0 & 1 \end{bmatrix} \begin{bmatrix} X \\ Y \\ Z \end{bmatrix} \Leftrightarrow x = \frac{1}{s} KX,$$

Where, s represents a scaling factor, $f_x$ and $f_y$ respectively represent the camera focal length on the x-axis and y-axis, $m_x$ and $m_y$ respectively represent the camera center points on the x-axis and y-axis, K represents the internal parameter matrix of the camera, $$K = \begin{bmatrix} f_x & 0 & m_x \\ 0 & f_y & m_y \\ 0 & 0 & 1 \end{bmatrix},$$

X represents the three-dimensional point of the item in the camera coordinate system, $X=[X\ Y\ Z]^T$, represents the three-dimensional point of the item in the image, $x=[u\ v]^T$.

Based on the above relationship, for a depth camera, the following formula exists:

$$d_2 \begin{bmatrix} u_2 \\ v_2 \\ 1 \end{bmatrix} = K_2 \begin{bmatrix} X_2 \\ Y_2 \\ Z_2 \end{bmatrix} \Rightarrow \begin{bmatrix} X_2 \\ Y_2 \\ Z_2 \end{bmatrix} = d_2 K_2^{-1} \begin{bmatrix} u_2 \\ v_2 \\ 1 \end{bmatrix}, \quad \text{formula (1)}$$

where, $d_2$ represents depth information of the depth camera 2, $[u_2\ v_2\ 1]^T$ represents the position of the item in the depth image, $K_2$ represents the internal parameter matrix of the depth camera 2, $[X_2\ Y_2\ Z_2]^T$ represents the position of the item in the coordinate system of the depth camera 2.

In the above formula (1), the depth $d_2$, the internal parameter matrix $K_2$ and the position of the item in the depth image $[u_2\ v_2\ 1]T$ are known parameters, therefore, the position of the item in coordinate system of the depth camera 2, i.e., $[X_2\ Y_2\ Z_2]^T$ may be calculated according to the lens parameter of the depth camera, the depth information and the position of the item in the depth image.

Similarly, for cameras 1 and 3, the following formulas exist:

$$s_1 \begin{bmatrix} u_1 \\ v_1 \\ 1 \end{bmatrix} = K_1 \begin{bmatrix} X_1 \\ Y_1 \\ Z_1 \end{bmatrix}, \quad \text{formula (2)}$$

$$s_3 \begin{bmatrix} u_3 \\ v_3 \\ 1 \end{bmatrix} = K_3 \begin{bmatrix} X_3 \\ Y_3 \\ Z_3 \end{bmatrix}, \quad \text{formula (3)}$$

In the embodiment of the present disclosure, the relative position relationship $T_{12}$ of the camera 1 relative to depth camera 2 and the relative position relationship $T_{32}$ of the camera 3 relative to depth camera 2 are calculated based on the coordinate system of the depth camera 2, where $T_{12}$ represents the relative position relationship of the coordinate system of the depth camera 2 to the coordinate system of the depth camera 1, and $T_{32}$ represents the relative position relationship of the coordinate system of the depth camera 2 to the coordinate system of the depth camera 3.

Therefore, the position of the item in the coordinate system of the camera 1 (i.e., $[X_1\ Y_1\ Z_1]^T$) may be obtained according to the position of the item in coordinate system of the depth camera 2 (i.e., $[X_2\ Y_2\ Z_2]^T$) and the relative position relationship $T_{12}$, that is $$\begin{bmatrix} X_1 \\ Y_1 \\ Z_1 \end{bmatrix} = T_{12} \begin{bmatrix} X_2 \\ Y_2 \\ Z_2 \end{bmatrix}, \qquad \text{formula (4)}$$

similarly, the position of the item in the coordinate system of the camera 3 (i.e., $[X_3\ Y_3\ Z_3]^T$) may be obtained according to the position of the item in coordinate system of the depth camera 2 (i.e., $[X_2\ Y_2\ Z_2]^T$) and the relative position relationship $T_{32}$, that is $$\begin{bmatrix} X_3 \\ Y_3 \\ Z_3 \end{bmatrix} = T_{32} \begin{bmatrix} X_2 \\ Y_2 \\ Z_2 \end{bmatrix}, \qquad \text{formula (5)}$$

the formulas (1), (4) and (5) are separately substituted into formulas (2) and (3), and the following may be obtained after transformation:

$$\begin{bmatrix} u_1 \\ v_1 \\ 1 \end{bmatrix} = \frac{1}{s_1} K_1 T_{12} K_2^{-1} d_2 \begin{bmatrix} u_2 \\ v_2 \\ 1 \end{bmatrix},$$

$$\begin{bmatrix} u_3 \\ v_3 \\ 1 \end{bmatrix} = \frac{1}{s_3} K_3 T_{32} K_2^{-1} d_2 \begin{bmatrix} u_2 \\ v_2 \\ 1 \end{bmatrix},$$

the position of the item in the depth image (i.e., $[u_2\ v_2]$) is transformed into the position $[u_1\ v_1]$ in the image captured by the camera 1 and the position $[u_3\ v_3]$ in the image captured by the camera 3 respectively.

Through the above formula, it is possible to determine the imaging point of the item in other cameras corresponding to imaging point of the item in the depth camera. That is, the item captured by the depth camera is mapped to other general cameras, and the categories and number of the items captured by different cameras are compared to determine whether or not there is any error. When determining that there are some errors, the server may recalculate and compare to determine the identification result of the item.

The above described multi-modal fusion can accurately identify the item in the image to obtain the fusion result of the item in the image.

At step S210, the identification result of the item is determined according to the category information and fusion result.

That is, the identification result of the item may be determined according to the category of the item analyzed in advance, and mainly, the category of the item, the number of each category, and the specific item may be determined according to the present disclosure.

After analyzing the entire video, successive multi-frame images may be analyzed to determine the data of the item that being taken and returned.

In the embodiment of the present disclosure, the determination of item that being taken and returned includes three methods.

In a first method, the item that being taken and returned by the user may be determined according to the identification result of the item in the multi-frame images.

In the embodiment of the present disclosure, when analyzing the item that being taken and returned, the method further includes: determining a tracking trajectory of the item according to the fusion result; sorting the tracking trajectory to obtain a trajectory classification result, and the tracking trajectory result corresponds to a movement result of the item; determining a taking result and a returning result according to the trajectory classification result; and updating an item management list according to the taking result and the returning result.

That is, the method may include three steps. The first step is the trajectory tracking based on the information capturing device and the image capturing device. The second step is the trajectory classification based on machine learning. And the third step is the discrimination of the trajectory classification result. Optionally, when performing the trajectory tracking, determining the tracking trajectory according to the fusion result may include: acquiring the position information and a movement tendency of the item according to the fusion result; and determining a matching degree between a detection result of the current frame and a detection result of the previous frame according to a coincidence similarity and a feature similarity between a current detection box and a predicated prior box of the item to obtain the tracking trajectory of the item, and the predicated prior box is obtained according to the moving tendency of the item based on the position information of the item in the previous frame; and the tracking trajectory includes: a position, category and movement time stamp of the item at each time node.

An RGB camera that captures RGB images is served as the image capturing device, and a depth image is served as the information capturing device for description. The multi-modal fusion of the information of the depth camera and the RGB camera may enable the system to acquire the position information and movement tendency of the item, and determine the matching degree between the detection result of the current frame and the detection result of the previous frame according to the coincidence similarity and the feature similarity between the current detection box and the predicated prior box of the item, as show in the following formula:

$$r = \alpha IOU(\text{BBox}_{current}, \text{BBox}_{predict}) + \beta f(\text{BBox}_{current}, \text{BBox}_{predict}),$$

where r represents the matching degree between the detection result of the current frame and the detection result of the previous frame, IOU ($\text{BBox}_{current}$, $\text{BBox}_{predict}$) represents the coincidence similarity between the current detection box and the predicated prior box of the item, f($\text{BBox}_{current}$, $\text{BBox}_{predict}$) represents the feature similarity between the current detection box and the predicated prior box of the item, $\alpha$ and $\beta$ represent weighting coefficients of the coincidence similarity and the feature similarity, where, the predicated prior box is obtained according to the movement tendency of the item on the basis of the position information of the item of the previous frame.

A complete tracking trajectory may be formed by connecting the successive detection results, the tracking trajectory includes: the position, category and movement time stamp of the item at each time node, i.e., each time node can include the position, category and movement time stamp of the item, etc.

For the trajectory classification, namely the second step of the trajectory classification based on the machine learning, optionally, the step of obtaining the trajectory classification result by classifying the tracking trajectory includes: extracting the movement length of the item from the tracking trajectory; and classifying the tracking trajectory according to a pre-trained classify obtaining the trajectory classification decision tree model and the movement length of the item to obtain the trajectory classification result.

In an optional embodiment of the present disclosure, the trajectory is classified by combining the artificial extraction parameter of the tracking trajectory with the decision tree model recognition algorithm. Based on expert experience, the trajectory length extracted from the trajectory, and features, such as the starting position, the maximum position and the ending position in the image, are combined with the decision tree model. In this way, the trajectory may be classified into six categories as follows: "really be taken", "really be returned", "may be taken", and "may be returned", "false identification" and "others".

For the trajectory determination, namely the third step of the discrimination of the trajectory classification result, optionally, the step of determining a taking result and a returning result according to the trajectory classification result includes: obtaining a trajectory classification result of the image capturing device, or the image capturing device combined with the information capturing device at the same time; establishing a classification determination scheme based on the classification rule base according to the trajectory classification result of the image capturing device, or the image capturing device combined with the information capturing device obtained at the same time; and determining the taking result or returning result according to the classification determination scheme and the trajectory classification result.

Optionally, when performing the classification determination, the above classification result may be determined, and the trajectory classification result of the image capturing device may be determined based on a classification rule base. Optionally, multiple cameras and at least one depth camera are taken as examples for description. At least one classification rule established is described as follows.

If most cameras determine "really be taken" or "really be returned", the result is confirmed.

If most cameras determine "may be", while a few cameras determine "really", the result is determined as "really".

If most cameras determine "may be taken" or "may be returned", the result is determined as "be taken" or "be returned".

If the directions of the camera results are controversial, the result is ignored. Through the above method, the item in the multi-frame images may be identified, and the items being taken and returned by the user (or machine) may be determined by the trajectory tracking, trajectory classification, classification determination and the like, and thereby preparing for the subsequent settlement.

In a second method, the item that being taken and returned may be determined by sales reference line.

Optionally, the method according to an embodiment of the present disclosure further includes: determining a sales reference line in a picture captured by the image capturing device, where the sales reference line is used for determining the operations of taking and returning the item; determining the categories and number of items being taken from the item storage device (such as a container) and determining the categories and number of items being returned back to the item storage device according to the sales reference line.

That is, the sales reference line 1 may be defined in the field of view of the camera, and the item is determined to be taken when the item passes the reference sales reference line from inside to the outside of the container. Otherwise, the item is determined to be returned when the item passes the reference sales line from outside to the inside of the container.

In a third method, the item that being taken and returned by the user may be detected in real time based on the item sensing area.

Optionally, the method in an optional embodiment of the present disclosure further includes: determining a coordinate system of each image capturing device; defining an item sensing area in the coordinate system; determining the categories and number of the items being taken from the item storage device and the item being returned back to the item storage device through the item sensing area and video.

That is, an effective area (namely the item sensing area) is defined in the coordinate system of the camera, the number of items is detected in this area in real time, a moving direction (which may be determined according to a starting position of each item and an ending position of each item) of each item is determined according to the information of two adjacent frames to make a decision of taking and returning operations.

Through the above steps, the item that being taken and being returned by the user may be determined, and then may be settled automatically.

In another optional embodiment of the present disclosure, the above item identification method further includes: obtaining an item price list, where the item price list includes a price of each item; determining the categories and number of the items being taken according to the taking result and returning result; and determining an item settlement price according to the categories and number of the items being taken and the price of each item.

Optionally, the above item price list may be a price list used by a shop (or other shopping malls, etc.) having item storage devices. The item price list records the item stored in each item storage device, items that being taken and returned, and thereby the item can be automatically managed through the item price list according to an optional embodiment of the present disclosure.

Through the embodiments of the present disclosure, the accuracy of the item identification and counting can be effectively improved, the container cost and the operation cost can be greatly reduced, and the loss rate can be effectively reduced.

In another embodiment of the present disclosure, an electronic device is provided, which includes: a processor; and a memory for storing executable instructions of the processor; where the processor is configured to perform any of above-mentioned item identification methods by executing the executable instructions.

In another embodiment of the present disclosure, a storage medium for storing programs is provided, where a device in which the storage medium is stored is controlled to execute any of the item identification methods when the program is running.

In another embodiment of the present disclosure, an apparatus is also provided, the apparatus includes a processor, a memory, and programs stored in the memory and executable by the processor, the following steps are performed when the processor executes the programs:

acquiring multi-frame images of the item by an image capturing device;

processing the multi-frame images of the item to obtain position information and category information of the item in each frame image; acquiring auxiliary information of the item by an information capturing device; performing multi-modality fusion on the position information and the auxiliary information to obtain a fusion result; and determining an identification result of the item according to the category information and the fusion result.

Optionally, when the processor executes the programs, the following steps may also be performed: performing the image pre-processing on the each frame image of the item, where the image pre-processing may include at least one of the following: image enhancement, image scaling, and image mean remove; determining the item detection box and category information in the each frame image after image pre-processing, where the item detection box includes at least one item; and determining the position information of the item according to the item detection box.

Optionally, when the processor executes the programs, the following step may also be included: performing NMS on the item detection box.

Optionally, when the processor executes the programs, the following step may also be included: acquiring the multi-frame images of a target part by the image capturing device; and processing the multi-frame images of the target part to obtain the position information and a determination result of the target part in the each frame image.

Optionally, when the processor executes the programs, the following step may also be included: determining the identification result of the item according to the position information and the determination result of the target part in the each frame image, and the category information and the fusion result of the item in the each frame image.

Optionally, when the processor executes the programs, the following step may also be included: performing image pre-processing on the target part in the each frame image to enhance an image contour of a target part of an user, where the image preprocess may include least one of the following: image noise reduction, image enhancement, contrast enhancement, image smoothing, image sharpening, etc.; selecting the ROI of a part where the target part of the user appears in the each frame image after the image pre-processing; extracting feature information in the ROI of the part to obtain a plurality of part features; and identifying the plurality of part features by a pre-trained classifier to obtain the position information and the determination result of the target part in the each frame image.

Optionally, when the processor executes the programs, the following step may also be included: scanning the each frame image through at least one sub-window to determine the ROI of the part where the target part of the user appears in the each frame image.

Optionally, when the processor executes the programs, the following step may also be included: performing fine-grained classification on the item.

Optionally, when the processor executes the programs, the following step may also be included: acquiring, when the information capturing device is the depth camera, a depth image of the item by the depth camera, the auxiliary information of the item comprising depth information.

Optionally, when the processor executes the programs, the following step may also be included: acquiring lens parameters and coordinate parameters of the image capturing device and the depth camera; acquiring the position of the item in the coordinate system of the depth camera according to the lens parameter of the depth camera, the depth information and the position of the item in the depth image; calibrating, according to the position parameters of the image capturing device and the depth camera, a relative position relationship of the image capturing device relative to the depth camera based on the coordinate system of the depth camera; determining mapping position information of the item in the image captured by the image capturing device corresponding to the position of the item in the depth image according to the lens parameters, the position of the item in the depth image, the depth information and the relative position relationship; and comparing the position information with the mapping position information to obtain the fusion result.

Optionally, when the processor executes the programs, the following step may also be included: turning on the image capturing device to obtain a video of the item; and intercepting the multi-frame images of the item from the video.

Optionally, when the processor executes the programs, the following step may also be included: determining a tracking trajectory of the item according to the fusion result; sorting the tracking trajectory to obtain the trajectory classification result, where the tracking trajectory result corresponds to the movement result of the item; determining the taking result and the returning result according to the trajectory classification result; and updating the item management list according to the taking result and the returning result.

Optionally, when the processor executes the programs, the following step may also be included: acquiring the position information and the moving tendency of the item according to the fusion result; and determining the matching degree between the detection result of a current frame and the detection result of a previous frame according to the coincidence similarity and the feature similarity between the current detection box and the predicated prior box of the item to obtain the tracking trajectory of the item, where, the predicated prior box is obtained according to the moving tendency of the item based on the position information of the item in the previous frame; and the tracking trajectory includes: the position, category and movement time stamp of the item at each time node.

Optionally, when the processor executes the programs, the following step may also be included: extracting the movement length of the item from the tracking trajectory; and sorting the tracking trajectory according to the pre-trained classification decision tree model and the movement length of the item to obtain the trajectory classification result.

Optionally, when the processor executes the programs, the following step may also be included: obtaining the trajectory classification result of the image capturing device, or the image capturing device combined with the information capturing device at the same time; establishing a classification determination scheme according to the trajectory classification result of the image capturing device, or the image capturing device combined with the information capturing device at the same time; and determining the taking result or the returning result of the item according to the classification determination scheme and the trajectory classification result.

Optionally, when the processor executes the programs, the following step may also be included: obtaining the item price list, and the item price list includes the price of each item; determining the categories and number of the items being taken according to the taking result and the returning result of the item; and determining the settlement price of the item according to the categories and number of the items being taken, and a price of the each item.

The present disclosure also provides a computer program product, the program is adapted to be executed with the initialized following steps when it is executed on a data processing device: acquiring the multi-frame images of the item by the image capturing device; processing the multi-frame images of the item to obtain position information and category information of the item in each frame image; acquiring auxiliary information of the item by an information capturing device; obtaining the fusion result by performing multi-modality fusion on the position information and the auxiliary information; and determining the identification result of the item according to the category information and the fusion result.

The serial numbers of the embodiments of the present disclosure are merely for description, and do not represent the advantages and disadvantages of the embodiments.

In the above-mentioned embodiments of the present disclosure, the description of the various embodiments has different emphasis, and the parts that are not detailed in certain embodiment can be referred to the related description of other embodiments.

In the embodiments provided by the present disclosure, it should be understood that the disclosed technical contents may be implemented in other manner. The embodiment of the above described device is only an example, for example, the elements may be divided according to logical functions. In actual implementations, there may be another division manner, for example, multiple elements or components may be combined or integrated into another system, or some features can be ignored or not be executed. In addition, the mutual coupling or direct coupling or communication as shown or discussed can be an indirect coupling or communication through some interfaces, elements or components, and may be electrical or in other forms.

The elements described as separate components may be or may not be physical separated, the components shown as elements may be or may not be physical elements, that is, may be located in one place, or may be distributed to multiple elements. Some or all of the elements may be selected according to actual requirements to achieve the purpose of the solution according to the embodiment of the present disclosure.

In addition, the various function elements in the embodiments of the present disclosure may be integrated into one processing element, or each element may exist physically separately, or two or more elements may be integrated into one element. The above integrated element may be implemented in the form of hardware or in the form of a software functional element.

The integrated element, if implemented in the form of a software functional element and sold or used as an independent product, can be stored in a computer readable storage medium. Based on such understanding, the essential part or the part that contributes relative to the prior art, or the all or part of the technical solution of the present disclosure may be embodied in the form of a software product. The computer software product may be stored in a storage medium, and the storage medium includes a number of instructions to enable a computer device (may be a personal computer, a server or a network device, etc.) to execute all or part of the steps of the methods described in embodiments of the present disclosure. The storage medium includes: a U disk, a Read-Only Memory (ROM), a Random Access Memory (RAM), a removable hard disk, a magnetic disk or an optical disk, and other mediums for storing the program codes.

The above described are some exemplary embodiments of the present disclosure, and it should be noted that those skilled in the art may also make several improvements and amendments without departing from the principles of the present disclosure, and those improvements and amendments should be considered within the protection scope of the present disclosure.

What is claimed is:

1. An item identification method, comprising:
   acquiring multi-frame images of the item by an image capturing device;
   processing the multi-frame images of the item to obtain position information and category information of the item in each frame image;
   acquiring auxiliary information of the item by an information capturing device;
   performing multi-modality fusion on the position information and the auxiliary information to obtain a fusion result; and
   determining an identification result of the item according to the category information and the fusion result;
   wherein the method further comprises: determining a tracking trajectory of the item according to the fusion result; sorting the tracking trajectory to obtain a trajectory classification result, wherein the tracking trajectory result corresponds to a movement result of the item; determining a taking result and a returning result according to the trajectory classification result; and updating an item management list according to the taking result and the returning result.

2. The method as claimed in claim 1, wherein processing the multi-frame images of the item to obtain the position information and the category information of the item in each frame image comprising:
   performing image pre-processing on each frame image of the item;
   determining an item detection box and the category information in the each frame image after the image pre-processing, wherein the item detection box comprises at least one item; and
   determining the position information of the item according to the item detection box.

3. The method as claimed in claim 2, wherein the method further comprises:
   performing non-maximum suppression on the item detection box.

4. The method as claimed in claim 1, wherein the method further comprises:
   acquiring multi-frame images of a target part by the image capturing device; and
   processing the multi-frame images of the target part to obtain position information and a determination result of the target part in the each frame image.

5. The method as claimed in claim 4, wherein the method further comprises:
   determining the identification result of the item according to the position information and the determination result of the target part in the each frame image, and the category information and the fusion result of the item in the each frame image.

6. The method as claimed in claim 4, wherein processing the multi-frame images of the target part to obtain the position information and the category information of the target part in the each frame image comprising:
   performing image pre-processing on the target part in the each frame image to enhance an image contour of a target part of a user;
   selecting a region of interest of a part where the target part of the user appears in the each frame image after the image pre-processing;

extracting feature information in the region of interest of the part to obtain a plurality of part features; and identifying the plurality of part features by a pre-trained classifier to obtain the position information and the determination result of the target part in the each frame image.

7. The method as claimed in claim 6, wherein selecting the region of interest of the part where the target part of the user appears in the each frame image after the image pre-processing comprising:

scanning the each frame image through at least one sub-window to determine the region of interest of the part where the target part of the user appears in the each frame image.

8. The method as claimed in claim 1, wherein the method further comprises:

performing fine-grained classification on the item;

or wherein the information capturing device comprises at least one of the following: a depth camera, a card reader, a gravity device and an odor sensor.

9. The method as claimed in claim 8, wherein the method further comprises:

acquiring, when the information capturing device is the depth camera, a depth image of the item by the depth camera, the auxiliary information of the item comprising depth information.

10. The method as claimed in claim 9, wherein performing multi-modality fusion on the position information and the auxiliary information to obtain the fusion result comprising:

acquiring lens parameters and position parameters of the image capturing device and the depth camera;

obtaining a position of the item in a coordinate system of the depth camera according to the lens parameters of the depth camera, the depth information and the position of the item in the depth image;

calibrating, according to the position parameters of the image capturing device and the depth camera, a relative position relationship of the image capturing device relative to the depth camera based on the coordinate system of the depth camera;

determining mapping position information of the item in the image captured by the image capturing device corresponding to the position of the item in the depth image according to the lens parameters, the position of the item in the depth image, the depth information and the relative position relationship; and comparing the position information with the mapping position information to obtain the fusion result.

11. The method as claimed in claim 1, wherein acquiring the multi-frame images of the item by the image capturing device comprising:

turning on the image capturing device to obtain a video of the item; and intercepting the multi-frame images of the item from the video;

or wherein the method further comprises:

obtaining an item price list, wherein the item price list comprises a price of each item;

determining categories and number of the items being taken according to a taking result and a returning result of the item; and determining a settlement price of the item according to the categories and number of the items being taken and a price of the each item;

or wherein the method is applied to a new retail scenario, and the new retail scenario comprising at least one of following: self-service stores and smart containers.

12. The method as claimed in claim 1, wherein determining the tracking trajectory according to the fusion result comprising:

acquiring the position information and a moving tendency of the item according to the fusion result; and determining a matching degree between a detection result of a current frame and a detection result of a previous frame according to a coincidence similarity and a feature similarity between a current detection box and a predicated prior box of the item to obtain the tracking trajectory of the item, wherein the predicated prior box is obtained according to the moving tendency of the item based on the position information of the item in the previous frame; and the tracking trajectory comprises: a position, category and movement time stamp of the item at each time node.

13. The method as claimed in claim 1, wherein sorting the tracking trajectory to obtain the trajectory classification result comprising:

extracting a movement length of the item from the tracking trajectory; and sorting the tracking trajectory according to a pre-trained classification decision tree model and the movement length of the item to obtain the trajectory classification result.

14. The method as claimed in claim 1, wherein determining the taking result and the returning result according to the trajectory classification result comprising:

obtaining the trajectory classification result of the image capturing device, or the image capturing device combined with the information capturing device at the same time;

establishing a classification determination scheme according to the trajectory classification result of the image capturing device, or the image capturing device combined with the information capturing device at the same time; and determining the taking result or the returning result of the item according to the classification determination scheme and the trajectory classification result.

15. An item identification system, comprising:

an image capturing device, configured to acquire multi-frame images of the item;

an information capturing device, configured to acquire auxiliary information of the item; and a server, configured to process the multi-frame images of the item to obtain position information and category information of the item in each frame image, perform multi-modality fusion on the position information and the auxiliary information to obtain a fusion result, and determine an identification result of the item according to the category information and the fusion result;

wherein the system is further configured to determine a tracking trajectory of the item according to the fusion result; sort the tracking trajectory to obtain a trajectory classification result, wherein the tracking trajectory result corresponds to a movement result of the item; determine a taking result and a returning result according to the trajectory classification result; and update an item management list according to the taking result and the returning result.

16. The item identification system as claimed in claim 15, wherein the image capturing device is further configured to obtain multi-frame images of a target part;

or further comprising: an item storage device, the image capturing device and the information capturing device are turned on when the item storage device is opened.

17. The item identification system as claimed in claim 16, wherein the server is further configured to process the multi-frame images of the target part to obtain position information and a determination result of the target part in the each frame image, and determine the identification result of the item according to the position information and the determination result of the target part, and the category information and the fusion result of the item in the each frame image.

18. An electronic device, comprising:
a processor; and
a memory for storing executable instructions of the processor;
wherein the processor is configured to perform the item identification method as claimed in claim 1 by executing the executable instructions.

19. A storage medium, wherein the storage medium comprises a stored program, wherein a device in which the storage medium is stored is controlled to execute the item identification method as claimed in claim 1 when the program is running.

* * * * *